Oct. 8, 1929.   H. E. PELLETIER   1,730,475

FILTER

Filed May 23, 1925

INVENTOR
Henry E. Pelletier
BY
Harry Jacobson
ATTORNEY

Patented Oct. 8, 1929

1,730,475

UNITED STATES PATENT OFFICE

HENRY E. PELLETIER, OF JERSEY CITY, NEW JERSEY, ASSIGNOR TO PELCO AUTO PRODUCTS, INC., OF NEW YORK, N. Y., A CORPORATION OF NEW YORK

FILTER

Application filed May 23, 1925. Serial No. 32,243.

This invention relates to filters for removing foreign matter by screening and filtration from gases and liquids. Where an embodiment of my invention is utilized for the filtration of the fuel supplied to internal combustion engines, as for instance, the motors of automobiles, motor boats, airplanes or other transportation means, there being considerable vibration incident to the operation of said means, there is consequently some danger of the parts of my device shaking loose or becoming separated, and it is, therefore, desirable that means be provided for preventing the loosening or separation of the parts. Furthermore, it is desirable in a device of this character to provide such a screening surface, as has a maximum area, while occupying a minimum space, for removing the foreign matter from the gas or liquid. It is further desirable to simplify and to reduce the number of parts in the filter as far as possible, and it is one of the objects of the present invention to provide a structure meeting all of the requirements just set forth. In the specific example of my invention illustrated herein, provision is made for holding the main members of the filter against accidental separation or loosening of the parts such as that, for instance, resulting from excessive vibration of a motor vehicle. Means of a minimum volume are further provided, presenting a maximum area of screening surface, and the entire device is simplified and the cost thereof reduced by the reduction of the number of parts to a minimum.

The objects of my invention will be clear from the above and from the description which follows in which reference will be made to the accompanying drawings, wherein, Fig. 1 is a vertical section of one form of my improved filter.

Figure 1:
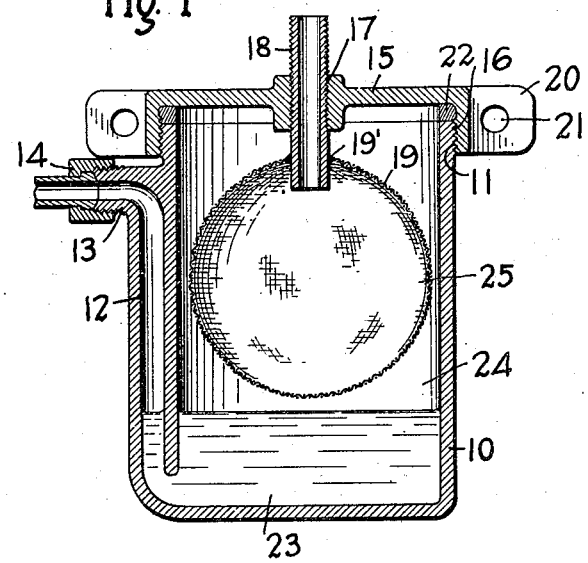

The container member 10 is suitably threaded at its upper end, as at 11, and is provided with the inlet pipe or passage 12 preferably cast integral therewith, communicating with the lower end of the interior of said container. The upper end of the inlet passage is provided with a preferably right angle extension 13 suitably threaded for the connection thereto of the conventional pipe nipple 14. A cap 15 preferably internally threaded as at 16 to engage the threads 11 of the container 10 is provided with a preferably central opening 17, in which the outlet pipe 18 or other outlet means may be suitably secured. A gasket 22 is preferably interposed between the upper surface of the container 10 and the under surface of the cap 15 to form a leak-proof closure therebetween. The screen 19 is designed to exclude solids and foreign liquid matter from the outlet compartment formed by said screen and in order to present the maximum screening area is made spherical in shape. Said screen is suitably attached to the inlet pipe 18 or to the cap 15 as by means of the soldered connection 19'. In order that my device may be suitably secured in proper position, as, for instance, to the substantially vertical dash board of an automobile, extension lugs as 20 made integral with the cap 15 are provided, suitable holes as 21 through which screws or bolts may be passed being made in said lugs.

It is to be understood that a filtering medium 23 of greater specific gravity than the material to be purified, such as an inexpensive liquid like water, is to be placed in the inlet compartment 24 of the container 10 before the filter is ready for work at its maximum efficiency, so that the material to be cleansed must pass not only through the screen 19, but also through said filtering medium, whereby said material is not only screened, but also filtered. It is to be further understood that the screen 19 is preferably made of wire mesh, and is of such character that the comparatively heavy filtering medium 23 cannot pass therethrough, while the material to be filtered does readily pass therethrough into the outlet compartment 25.

For preventing the accidental separation of the cap 15 and the container 10, suitable teeth as 26 are provided on the outside of said container, while a preferably flat spring member 27, adapted to engage said teeth, is suitably secured to the cap 15. Said spring is maintained in place on said cap as by means of the members 28 engaging the upper surface of said spring, the upper end 29 of said spring being preferably bent upwardly to prevent disengagement thereof from the holding means 28. The teeth 26 are so shaped as to allow rotation of the cap 15 relatively to the container 10 when the threads 16 and 11 are in mutual engagement, in the direction for screwing said cap 15 and container 10 together, and for preventing the relative rotation of said cap 15 and container 10 in a direction which would cause disengagement of the cap and container. To disengage said cap and container it is merely necessary to lift the spring 27 slightly outwardly, out of engagement with the teeth 26, and while said spring is maintained in this position, the cap 15 may be readily rotated and removed.

Figure 2:
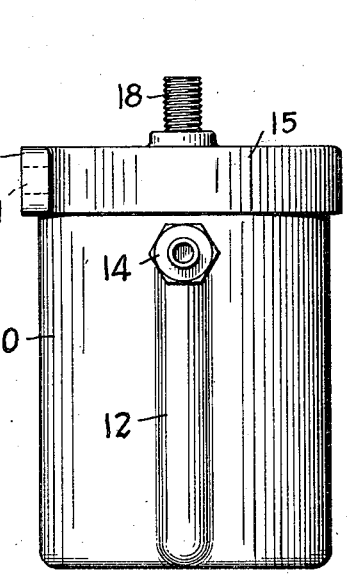
Fig. 2 is a side elevation thereof.
Figure 3:
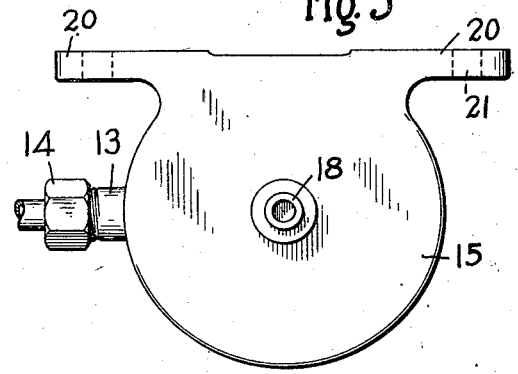
Fig. 3 is a top plan view thereof.
Figure 4:
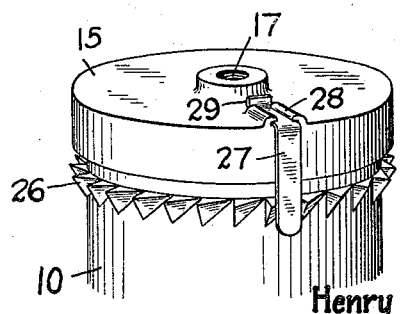
Fig. 4 is a perspective view of my device wherein the means for holding the main parts together is shown.

I have not illustrated the teeth 26, spring 27, and the holding means 28 in that form of my invention shown in Figs. 1, 2 and 3 for the reason that I deem it unnecessary therein. Rotation of that form of the cap 15 having the flanges 20, is prevented when said cap is secured in place, and rotation of the container 10 is also prevented when the inlet pipe is secured to the extension 13 thereof though it will be understood that as an additional precaution, said holding means may be used if desired, particularly if the inlet and outlet pipes are comparatively flexible.

The operation of my improved filter is as follows:

A small quantity of the filtering medium 23, preferably sufficient to reach above the lower end of the inlet pipe 12, having been inserted into the bottom of the container 10, said container may be screwed to the cap 15, which may then be secured in place by means of suitable screws or bolts not shown, passing through the holes 21 provided therefor, or the cap may first be secured in place and the container afterward screwed thereinto. The inlet pipe is then connected to the extension 13 and the outlet pipe to the outlet 18, and the device is ready for operation. In that form of my invention wherein no flanges 20 are provided on the cap, the members 10 and 15 may be assembled in the same manner, the spring 27 passing over the teeth 26 when the parts are being screwed together, but normally preventing the unscrewing of said parts by the engagement of said spring with said teeth. Suction on the outlet pipe 18, such as may be caused by the operation of an internal combustion motor, draws the medium to be cleansed through the inlet pipe 12 into the inlet compartment 24, and through the filtering medium 23. The material to be cleansed being much lighter than said medium rises to the surface thereof, while practically all of the impurities, such as sand and grit, and any other solid particles heavier than the filtering medium, sink to the bottom of the container. Those solid particles lighter than the filtering medium may rise to the surface but cannot pass through the screen 19. Water or other liquid impurity in the material to be cleansed is also eliminated by said filtering medium by reason of the greater density of said impurity than the material to be cleansed. The material passing through the screen 19 is withdrawn in its purified state through the outlet pipe 18, for further use thereof.

It will be seen that my device comprises very few parts, that it is simple in construction, easy to assemble, capable of economical construction, and efficient in its operation. It will further be seen that many uses can be found for my improved device, such as in the filtration of gasoline or other oil, and air, or other gaseous material and that my device is well adapted to meet the difficult conditions presented in practical operation.

I claim:

1. In a gasoline filter, a container member having an integral bottom thereon, ratchet teeth arranged below the top of the container, and projecting beyond the outer surface of said container, a cap adapted to be removably secured to the upper end of the container adjacent to and entirely above said teeth, a pair of opposed spaced projections on the top of the cap, and a spring of a single piece of flat sheet material bent into substantially L-shape, and having one leg thereof inserted between and secured in place by said projections on the upper face of the cap, the other leg of the L depending substantially vertically on the outside of the cap and arranged to have a vertical edge thereof engage a substantially radial face of the tooth adjacent thereto.

2. In a filter, a container member open at the top thereof to allow material to be inserted thereinto, ratchet teeth projecting from the outer face of said member, a cap of not greater outermost diameter than that of the line joining the outermost portions of said teeth, an L-shaped spring of flat sheet material secured to the top of the cap and arranged outside of the edge of the cap and depending below said cap, whereby the edge of said spring engages one of said teeth for preventing relative movement of the cap and the container member in one direction and allows such movement in the other direction, said spring depending below the lowermost part of said teeth.

3. In a filter, a container member, ratchet teeth projecting beyond the outer surface of said container, a cap arranged in spaced relation to and above said teeth, a spring secured to the cap and arranged entirely outside thereof and depending below the bottom of said cap and having a plane edge for engaging one of said teeth and thereby preventing relative rotation of said cap and said member in a direction effective to separate said cap from said member.

HENRY E. PELLETIER.